(12) United States Patent
Kadlec

(10) Patent No.: US 9,631,380 B2
(45) Date of Patent: Apr. 25, 2017

(54) DISPOSABLE PROTECTIVE SHEETING FOR DECKS AND FLOORS

(71) Applicant: Gary F. Kadlec, Dublin, OH (US)

(72) Inventor: Gary F. Kadlec, Dublin, OH (US)

(*) Notice: Subject to any disclaimer, the term of this patent is extended or adjusted under 35 U.S.C. 154(b) by 0 days.

(21) Appl. No.: 15/181,745

(22) Filed: Jun. 14, 2016

(65) Prior Publication Data

US 2016/0289983 A1 Oct. 6, 2016

Related U.S. Application Data

(62) Division of application No. 11/384,573, filed on Mar. 20, 2006, now abandoned.

(Continued)

(51) Int. Cl.

| | |
|---|---|
| E04G 21/24 | (2006.01) |
| B32B 5/02 | (2006.01) |
| B32B 5/26 | (2006.01) |
| B32B 7/12 | (2006.01) |
| B32B 21/02 | (2006.01) |
| B32B 21/10 | (2006.01) |
| B32B 27/02 | (2006.01) |
| B32B 27/10 | (2006.01) |

(Continued)

(52) U.S. Cl.
CPC ............. *E04G 21/24* (2013.01); *B32B 5/022* (2013.01); *B32B 5/26* (2013.01); *B32B 7/12* (2013.01); *B32B 21/02* (2013.01); *B32B 21/10* (2013.01); *B32B 27/02* (2013.01); *B32B 27/10* (2013.01); *B32B 27/12* (2013.01); *B32B 27/32* (2013.01); *B32B 29/02* (2013.01); *C09J 7/0296* (2013.01); *E04G 21/30* (2013.01); *B32B 2262/0253* (2013.01); *B32B 2307/724* (2013.01); *B32B 2307/7265* (2013.01); *B32B 2307/744* (2013.01); *B32B 2471/00* (2013.01); *E04G 2021/248* (2013.01); *Y10T 428/1476* (2015.01)

(58) Field of Classification Search
USPC .................................. 156/71, 247, 249, 701
See application file for complete search history.

(56) References Cited

U.S. PATENT DOCUMENTS 3,142,609 A 7/1964 Deretchin et al.
3,223,579 A 12/1965 Lineburg
(Continued)

OTHER PUBLICATIONS

Visqueen Building Products, Visqueen Vapor Barrier Product Sheet, Mar. 26, 2009.
(Continued)

*Primary Examiner* — Sing P Chan
(74) *Attorney, Agent, or Firm* — Porter Wright Morris & Arthur, LLP

(57) ABSTRACT

Disposable protective sheeting covers decks and floors during construction and the like. The protective sheeting includes a first layer of a barrier material impervious to liquid and pervious to vapor and a second layer of an overlay material providing a slip-resistant upper surface that is bonded to the first layer. Alternatively, the sheeting can be a single layer of barrier material treated to be slip resistant. The sheeting can be provided in rolls and temporarily secured to the decks and floors at the construction site or pre-installed onto decking materials off-site. When construction is complete, the disposable protective sheeting is removed to expose a contamination and damage free surface.

20 Claims, 4 Drawing Sheets

Related U.S. Application Data

(60) Provisional application No. 60/663,830, filed on Mar. 21, 2005.

(51) Int. Cl.
   B32B 27/32   (2006.01)
   B32B 29/02   (2006.01)
   C09J 7/02    (2006.01)
   E04G 21/30   (2006.01)
   B32B 27/12   (2006.01)

(56) References Cited

U.S. PATENT DOCUMENTS

| | | | |
|---|---|---|---|
| 3,900,102 A | 8/1975 | Hurst | |
| 4,055,454 A | 10/1977 | Laske | |
| 4,552,792 A * | 11/1985 | Julian | B32B 21/06 156/228 |
| 5,133,166 A * | 7/1992 | Pacione | E04B 1/168 52/250 |
| 5,916,391 A * | 6/1999 | Riedel | B08B 17/00 156/71 |
| 5,948,707 A | 9/1999 | Crawley et al. | |
| 6,495,612 B1 | 12/2002 | Corzani et al. | |
| 6,656,557 B2 | 12/2003 | Phillips | |
| 2004/0259447 A1* | 12/2004 | Elkouh | B32B 1/00 442/121 |
| 2004/0261346 A1* | 12/2004 | Gibney | E04G 21/30 52/506.01 |
| 2004/0267226 A1 | 12/2004 | Dabi et al. | |

OTHER PUBLICATIONS

DuPont, DuPont Tyvek Homewrap vs. PinkWrap Housewrap, Building Science Bulletin, Mar. 2007.

* cited by examiner

US 9,631,380 B2

DISPOSABLE PROTECTIVE SHEETING FOR DECKS AND FLOORS

CROSS-REFERENCE TO RELATED APPLICATIONS

This application is a continuation-in-part of U.S. patent application Ser. No. 11/384,573 filed on Mar. 20, 2006, which claims the priority benefit of U.S. Provisional Patent Application No. 60/663,830 filed on Mar. 21, 2005, the disclosures of which are expressly incorporated herein in their entireties by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to materials and methods for building construction and, more particularly, to materials and methods for protecting decks and floors during building construction.

BACKGROUND OF THE INVENTION

In building construction, after either a basement or a crawl space has been completed, floor joists are installed and decking material is nailed to the floor joists to form a deck. The decking material is typically plywood, oriented strand board, composite particle board, or the like. Once the deck is formed, external and internal walls are constructed and nailed to the deck. If the building is multilevel, another set of floor joists is secured on top of load bearing walls and decking material is nailed into place onto the additional set of floor joists to form another deck. This process is repeated until all of the levels of the building are complete and a roof is constructed onto load bearing walls of the top level. The upper surface of these decks is typically the surface upon which flooring materials, such as carpet, tile, linoleum, wood, stone, or the like, is directly laid and/or secured. During new construction, remodeling or rebuilding, it is frequently necessary to replace or overlay damaged or contaminated decking material with new decking material.

Construction projects typically take at least several months to complete, during this time the upper surface of the deck is exposed to rain, snow, tracked-in mud, joint compound, dust, saw dust, paint, and other materials. Thus, the decking material often absorbs moisture causing edge swelling, raises-up, warps, and delaminates The decking material can also become caked with these materials and the decking material is virtually impossible to clean effectively because it has rough surfaces. From a cosmetic standpoint, the decking material looks very bad when covered with this contamination. Additionally, the adhesive used to secure certain flooring materials may not adhere effectively to the decking material because of this contamination and work loose prematurely. Furthermore, there are environmental issues as dust and other materials remaining on the decking material after construction are trapped below the flooring material and may eventually work their way out from under the flooring material to create problems for occupants with allergies to such materials. When damage and/or contamination are severe, it is necessary for the builder to incur significant costs to sand, treat or seal the existing decking material or to replace the existing decking material with new decking material before the final flooring is installed.

It is noted that other types of decks and floors can also be damaged and/or contaminated such as, for example, decks and floors of modular and manufactured housing during construction, decks and floors of trucks, trailers, storage facilities, storage containers, and the like during transportation and/or storage of messy or dirty materials, and new or existing floors whether wood, carpet, tile, linoleum, cement, stone, vinyl, or terrazzo, and the like.

Additionally, builders frequently incur significant costs installing neutral colored carpeting, wood floors, tile and the like in "spec" properties simply to cover up the contamination so they look presentable to prospects. This is obviously very expensive and often may need to be removed and replaced to satisfy a buyer, incurring further unanticipated expense. Accordingly, there is a need in the art for improved materials and methods for protecting decks and/or floors.

SUMMARY OF THE INVENTION

The present invention provides improved materials and methods for protecting decks and floors which overcomes at least some of the above-noted problems of the related art. Disclosed is a method of protecting a deck or floor during building construction comprising steps of, in combination, obtaining disposable protective sheeting configured for temporary securement to an upper surface the deck or floor to provide a barrier against liquid and solid contaminants during building construction and for removal from the upper surface of the deck or floor to be disposed at an appropriate time near completion of building construction, installing the disposable protective sheeting during construction so that persons can walk on the disposable protective sheeting to protect the floor or deck against liquid and solid contaminants during building construction, removing the disposable protective sheeting from the upper surface of the deck or floor before completion of building construction, and installing final flooring material onto the deck or floor after removing the disposable protective sheeting from the upper surface of the deck or floor.

Also disclosed is a method of making a protected panel of decking material for constructing a deck or floor of a building comprising steps of, in combination, obtaining panel of decking material having an upper surface for constructing the deck or floor, obtaining disposable protective sheeting configured for temporary securement to the panel of decking material to provide a barrier against liquid and solid contaminants during building construction and for removal from the upper surface of the panel of decking material before completion of building construction, and temporarily securing the disposable protective sheeting to the upper surface of the panel of decking material such that that the disposable protective sheeting can protect the floor or deck against liquid and solid contaminants during building construction and the disposable protective sheeting can be removed from the upper surface of the panel of decking material before completion of building construction.

Also disclosed is a method of protecting a deck or floor during building construction comprising steps of, in combination, obtaining panels of decking materials with disposable protective sheeting temporarily secured to an upper surface of the decking material, installing the panels of decking material with the disposable protective sheeting temporarily secured thereon to construct the deck or floor so that persons can walk on the disposable protective sheeting to protect the floor or deck against liquid and solid contaminants during building construction, removing the disposable protective sheeting from the upper surface of the deck or floor before completion of building construction, and installing final flooring material onto the deck or floor after removing the disposable protective sheeting from the upper surface of the deck or floor. The disposable protective sheeting is configured to provide a barrier against liquid and solid contaminants during building construction and for removal from the upper surface of the deck or floor to be disposed at an appropriate time near completion of building construction.

From the foregoing disclosure and the following more detailed description of various preferred embodiments it will be apparent to those skilled in the art that the present invention provides a significant advance in the technology and art of materials and methods for protecting decks and floors. Particularly significant in this regard is the potential the invention affords for providing a high quality, reliable, efficient, and low cost material and method. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
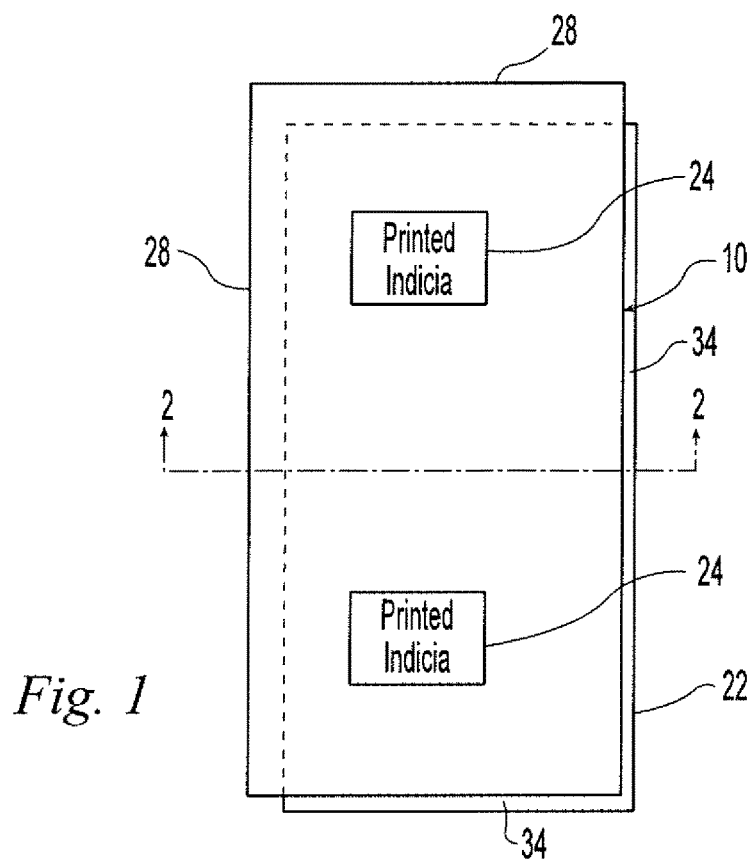
FIG. 1 is a top plan view of disposable protective sheeting according to a first embodiment of the present invention.

It should be understood that the appended drawings are not necessarily to scale, presenting a somewhat simplified representation of various preferred features illustrative of the basic principles of the invention. The specific design features of materials and methods for protecting decks and floors as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the disposable protective sheeting illustrated in the drawings. In general, up or upward refers to an upward direction out of the plane of the paper in FIGS. 1 and 5 and down or downward refers to a downward direction into the plane of the paper in FIGS. 1 and 5.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved materials and methods for protecting decks and floors disclosed herein. The following detailed discussion of various alternative and preferred embodiments will illustrate the general principles of the invention with reference to a preferred embodiment for protecting decks during commercial or residential building construction, remodeling, or rebuilding such as, for example homes, condos, apartments, offices, restaurants, clinics, institutional and industrial projects and the like. It is noted that the term "deck" or "decks" as used in this specification and claims means any generally horizontal support surface for walking on and/ or supporting furniture, equipment and the like and formed of materials such as, for example, plywood, oriented strand board (OSB), composite particle board, other engineered materials, concrete, concrete slab, and the like. Other embodiments suitable for other applications will be apparent to those skilled in the art given the benefit of this disclosure such as, for example, protecting decks and floors of modular and manufactured housing during construction, decks and floors of trucks, trailers, storage facilities, storage containers, and the like during transportation and/or storage of messy or dirty materials, and the protection of new or existing floors whether wood, carpet, tile, cement, stone, vinyl, linoleum, or terrazzo, and the like during construction, remodeling, or rebuilding.

Figure 2:
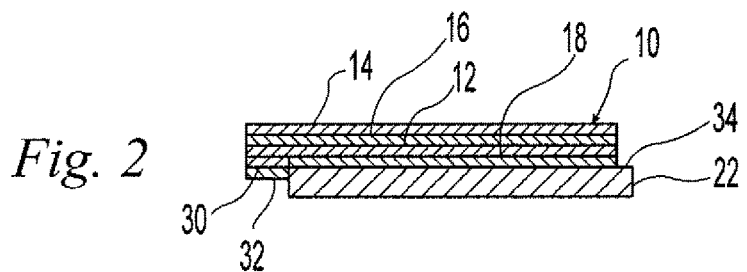
FIG. 2 is a cross-section view taken along line 2-2 of FIG. 1.

Referring now to the drawings, FIGS. 1 and 2 show disposable protective sheeting 10 according to a first preferred embodiment of the present invention. The illustrated disposable protective sheeting 10 is a multi-layer laminate that includes a first layer or sheet 12 of underlay or barrier material, a second layer or sheet 14 of overlay or non-skid material, adhesive 16 permanently bonding the second layer 14 to the top surface of the first layer 12, and a layer of adhesive 18 at the bottom surface of the first layer 12 for removably or temporarily securing the protective sheeting 10 to a deck 20 to be protected. The illustrated protective sheeting 10 is pre-applied to a panel of decking material 22 at off site and pre job installation at a factory, assembly plant, or any other suitable off construction-site location. The decking material can be, for example, plywood, oriented strand board (OSB), composite particle board, other engineered materials, or the like. The illustrated panel of decking material 22 is a standard-size panel of about 4 feet by about 8 feet but it is noted that any other suitable size can be utilized. It is noted that the sheeting 10 and/or the panel 22 can be treated with a fungicide to help prevent any mold from forming between or on the protective sheeting 10 and the panel 22.

The underlay or barrier material of the first layer 12 can preferably be any suitable material that provides a barrier that is permeable to water vapor, impermeable to liquids, and tear resistant. The underlay material protects the top surface of the deck 20 from contamination and permanent damage from spilled and tracked liquids and wet as well as dry substances, while at the same time preferably providing breathability to avoid condensation on the underside which can cause damage to the deck 20. The underlay material can be, for example, nonwoven spunbonded olefin available from E.I. DuPont known as TYVEK. Other suitable underlay materials are believed to be TYPAR available from BBA Fiberweb, R-WRAP and BARICADE available from Ludlow, RUFCOWRAP available from Raven Industries, AMOCOWRAP available from Propex Fabrics, PINKWRAP available from Owens Corning, and CHOICEWRAP available from Weyerhauser. The barrier material of the first layer 12 can alternatively be a polyethylene sheet including "Visqueen" which is waterproof but is not breathable or tear resistant.

The overlay material of the second layer 14 can be any suitable material that provides a non-skid upper surface without detrimentally affecting the breathability of the first layer 12. The overlay material can be a paper sheet such as, for example, kraft paper. It is believed that some absorption of liquid by a paper overlay layer will aid non-skid properties. The paper sheet also provides an upper surface that is easy to write on and mark during construction, remodeling, or rebuilding. The overlay material may be treated with a fire retardant if desired. The upper surface of the overlay material can also have printed indicia 24 such as, for example, the name and/or logo of a volume builder using the protective sheeting 10 in order to promote the company.

The adhesive 16 securing the second layer 14 to the first layer 12 can be any suitable adhesive that permanently bonds the second layer 14 to the first layer 12 without detrimentally affecting the breathability of the first layer 12. The adhesive 16 can be, for example, hot melt or any other suitable adhesive. The adhesive 16 can be applied as a continuous sheet or layer or can be applied on only a portion of the surfaces of the first and second layers 12, 14. Preferably, the adhesive 16 is applied to only about 10% to about 25% of the surfaces so that passage of vapor through the protective sheeting 10 is not overly impeded.

The layer of adhesive 18 that removably secures first layer 12 to the panel of decking material 22 can be any suitable material that temporarily bonds the first layer 12 to the panel of decking material 22 without detrimentally affecting the breathability of the first layer 12. The layer of adhesive 18 should allow the protective sheeting 10 to be peeled-back to nail or screw the panel of decking material 22 in place, such as to floor joists 26, to form the deck 20 and then adhered back in place to protect the constructed deck. The layer of adhesive 18 should also allow easy removal of the protective sheeting 10 from the panel of decking material 22 for disposal once the protective sheeting 10 is no longer needed, without leaving any significant residue. The layer of adhesive 18 preferably enables the protective sheeting 10 to behave like a large "Post-It Note". It is noted that additionally or alternatively the upper surface of the panel of decking material 22 can be treated with a release coating prior to the application of the protective sheeting 10 to facilitate easy removal of the protective sheeting 10 at the appropriate time in the construction, remodeling, or rebuilding process.

The illustrated protective sheeting 10 is sized and located on the panel of decking material 22 to provide overlap or overhanging portions or strips 28 along two adjacent edges of the panel of decking material 22. The overlap portions 28 extend beyond the edges of the panel 22 and are utilized to overlap joints between adjacent panels of decking material 22 once the panels 22 are installed to provide a continuous protective surface as described in more detail hereinafter. A bottom surface of the overlay portions 28 are provided with a layer pressure-sensitive adhesive 30 to secure the overlap portions 28 to the protection sheeting 10 of an adjacent panel 22 at installation of the panels 22. A release layer or liner 32 is provided on the layer of pressure-sensitive adhesive 30 to protect the layer of adhesive 30 until installation of the panels 22. The illustrated overlap portions 28 each have a width of about four inches but any other suitable width can alternatively be utilized. The illustrated protective sheeting 10 is sized and located on the panel of decking material 22 to provide open strips 34 that are free of the protective sheeting 10 along the two adjacent edges of the panel 22 that do not have the overlap portions 28. The open strips 34 are utilized to initially nail or screw the panel of decking material 22 in place before peeling back the protective sheeting 10 to complete installing the fasteners into the rest of the floor joists. This avoids installing the fasteners 36 through the protective sheeting 10 which would make it more difficult to later remove the protective sheeting. Once installation of the panel 22 is complete, the protective sheeting 10 is then placed back in its original position on the panel 22. The illustrated open strips 34 have a width of about one inch but any other suitable width can alternatively be utilized. It is noted that the illustrated protective sheeting 10 is about eight feet and three inches by about four feet and three inches to obtain the illustrated overlap portions 28 and open strips 34 with the illustrated standard-size panel of decking material 22 but it is noted that any other suitable size can alternatively be utilized.

Figure 9:
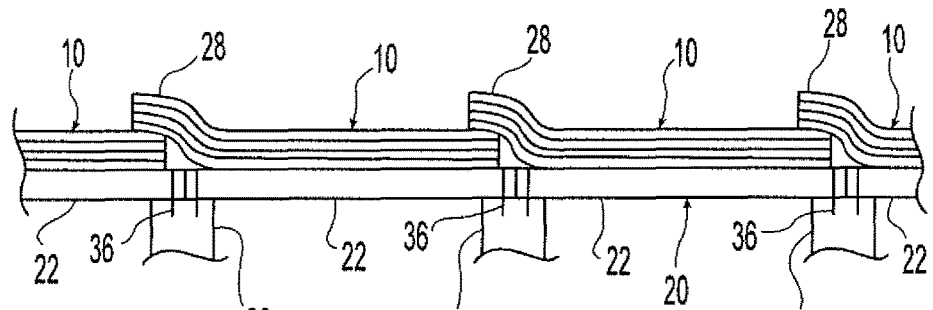
FIG. 9 is a cross-sectional view showing the disposable protective covering of FIGS. 1 and 2 installed on a deck of adjoining panels.

FIG. 9 shows the protective sheeting 10 on installed adjoining panels 22. The panels 22 are installed by installing the fasteners 36 along each edge of the panels 22. On two sides the fasteners 36 are installed along the open strips 34. On the other two sides, the protective sheeting 10 is temporarily peeled back so that the fasteners 36 for the deck panel 22 can be installed under the protective sheeting 10 and then is placed back onto the deck panel 22. As adjacent deck panels 22 are installed, the release liners 32 of the overlap portions 28 are removed and the overlap portions 28 are adhered onto the top surface of the protective sheeting 10 of the adjoining panel 22 so that the gaps or joints are covered to form a continuous protective covering. When applied to the deck 20 in this temporary manner, the protective sheeting 10 allows for easy removal at the end of construction to facilitate easy cleanup of the jobsite and to provide a clean surface for the installation of flooring material onto the deck surface. Once construction is complete and/or the property is ready for cleanup, the protective sheeting 10 is simply pulled up and discarded. The entire deck surface is vacuumed leaving the deck 20 in virtually new condition.

Figure 3:
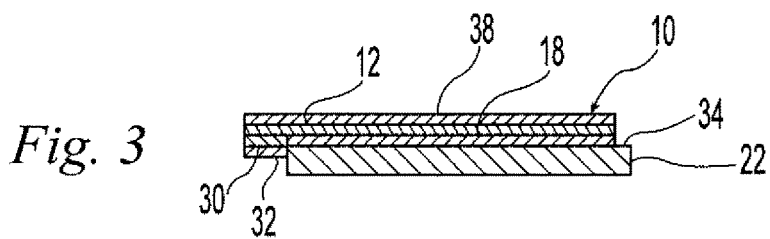
FIG. 3 is a cross-sectional view similar to FIG. 2 but showing a variation of the protective sheeting wherein an upper surface of the protective sheeting is treated to provide a non-slip surface rather than being laminated with a layer of paper.

FIG. 3 shows a variation of the first preferred embodiment of disposable protection sheeting 10 wherein the second layer 14 is eliminated and a suitable non-skid or slip-resistant surface 38 is provided directly onto the top surface of the first layer 12. The non-skid or slip-resistant surface 38 can be obtained by any suitable application, abrasion, coating, or the like in a manner that will not detrimentally affect the breathability of the first layer 12. This variation of the disposable protective sheeting 10 is preferably installed as discussed above.

Figure 4:
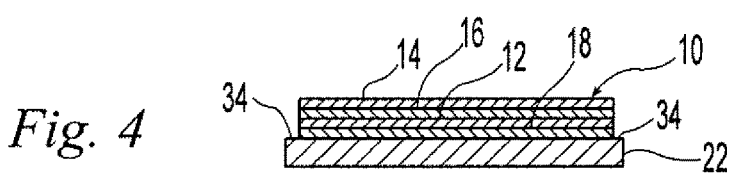
FIG. 4 is a cross-sectional view similar to FIG. 2 but showing another variation of the protective sheeting wherein it does not have an overlap portion for adjoining panels.

FIG. 4 shows another variation of the first preferred embodiment of disposable protective sheeting 10 wherein the overlap portions 28 are eliminated and replaced with additional open strips 34. The panels of decking material 22 are initially secured by inserting the fasteners 36 through the panel 22 at the open strips 34. The protective sheeting 10 is peeled back about half way to install fasteners in the exposed portion of the panel 22. That side of the protective sheeting 10 is placed back to its original position and the other half of the protective sheeting is peeled back and the process is repeated. Once installation of the panel 22 is complete and the protective sheeting 10 is in its original position, a thin strip or tape 40 of the protective sheeting 10 much like the overlap portions 28 is applied over the joints or seams between panels 22 to provide a continuous protective surface as described in more detail hereinafter. The illustrated tape 40 has a width of about four inches but any other suitable size can alternatively be utilized. It is believed that this variation may be more easily stored and shipped (as well as more easily installed because the protective sheeting 10 does not need to be initially peeled back to install the fasteners 36). It is noted that the illustrated protective sheeting 10 is about seven feet and ten inches by about three feet and ten inches to obtain the illustrated open strips 34 with the illustrated standard-size panel of decking material 22 but it is noted that any other suitable size can alternatively be utilized.

Figure 10:
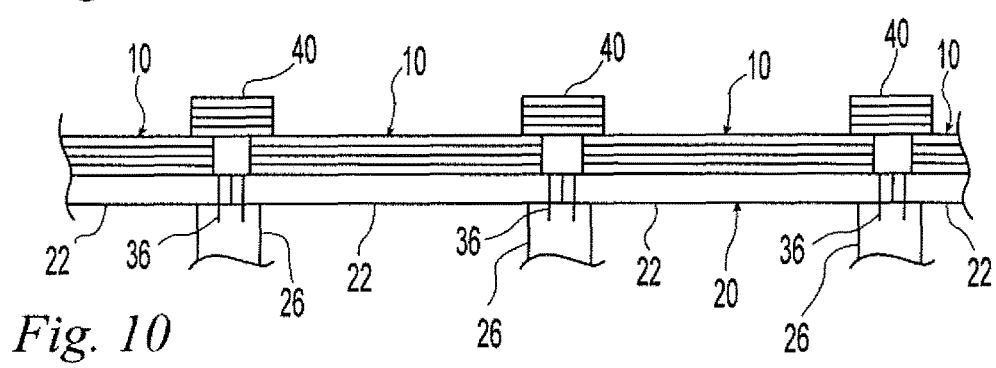
FIG. 10 is a cross-sectional view showing the disposable protective covering of FIG. 4 installed on a deck of adjoining panels.

FIG. 10 shows the variation of the protective sheeting 10 on installed adjoining panels 22. The panels 22 are installed by installing the fasteners 36 along each edge of the panels 22. The fasteners 36 are initially installed along the open strips 34 along the edges of the panels 22. Then the protective sheeting 10 is peeled back so that the panel 22 can be fastened under the protective sheeting 10 and the protective sheeting 10 is returned to its original position. Once adjacent panels 22 are installed, the tape 40 is installed over the joints or seams. The release liner 32 of the tape 40 is removed and the tape 40 is adhered onto the top surface of the protective sheeting 10 of the adjoining panels 22 so that the gaps or joints are covered to form a continuous protective covering. When applied to the deck 20 in this temporary manner, the protective sheeting 10 allows for easy removal at the end of construction to facilitate easy cleanup of the jobsite and to provide a clean surface for the installation of flooring material onto the deck 20. Once construction is complete and/or the property is ready for cleanup, the protective sheeting 10 and the tape 40 is simply pulled up and discarded. The entire deck surface is vacuumed leaving the deck 20 in virtually new condition.

Figure 5:
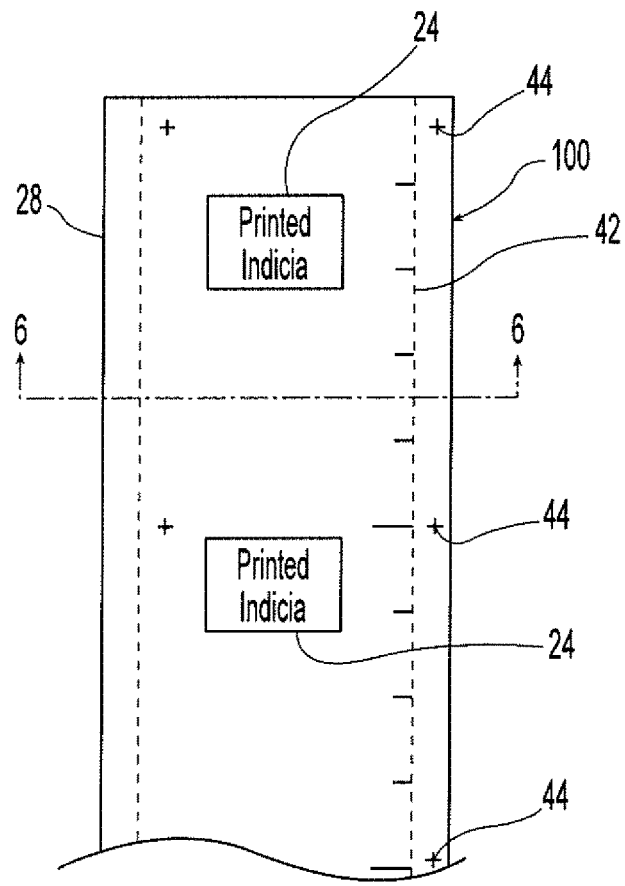
FIG. 5 is a top plan view of disposable protective sheeting according to a second embodiment of the present invention.
Figure 6:
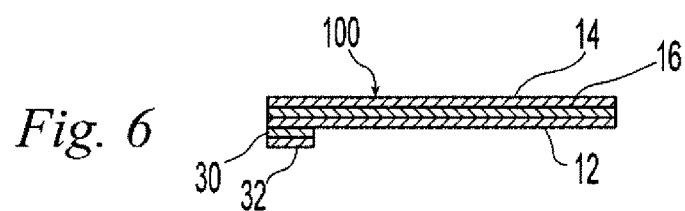
FIG. 6 is a cross-section view taken along line 6-6 of FIG. 5.

FIGS. 5 and 6 show disposable protective sheeting 100 according to a second preferred embodiment of the present invention wherein like reference numbers are utilized to indicate like structure. The illustrated disposable protective sheeting 100 is a multi-layer laminate similar to that described above but it is sized and shaped as a continuous web so that it can be stored and shipped in roll form and cut to length and attached to the panels of decking material 22 at the construction site after the panels 22 of decking material have been installed to the floor joists 26. The rolls are preferably "reverse rolled" so the materials lay flat. Accordingly, the layer of adhesive 18 at the bottom surface of the first layer 12 as described above has been eliminated. The top surface of the illustrated protective sheeting 100 is printed with lines 42 to facilitate alignment of the protective sheeting across the deck 22, cutting to length, as well as overlapping adjoining pieces of the protective sheeting 100. The illustrated top surface can also be printed with designated places 44 for tacking and/or stapling the protective sheeting 100 to the deck 22 to facilitate easy installation and removal. It is noted that this protective sheeting 100 can also be used to cover surfaces that are difficult to cover like stairs or any areas where protective sheeting becomes damaged while it is protecting the deck 20. In this application the protective sheeting 10 is taped along both edges with tape that would leave no residue. It is noted that the illustrated protective sheeting 100 has a width of about four feet and four inches to obtain the illustrated overlap portions 28 with the illustrated standard-size panels of decking material 22 but it is noted that any other suitable size can alternatively be utilized. It is also noted that the protective sheeting 100 can be treated with a fungicide to help prevent any mold from forming between or on the protective sheeting 100 and the panels 22.

Figure 11:
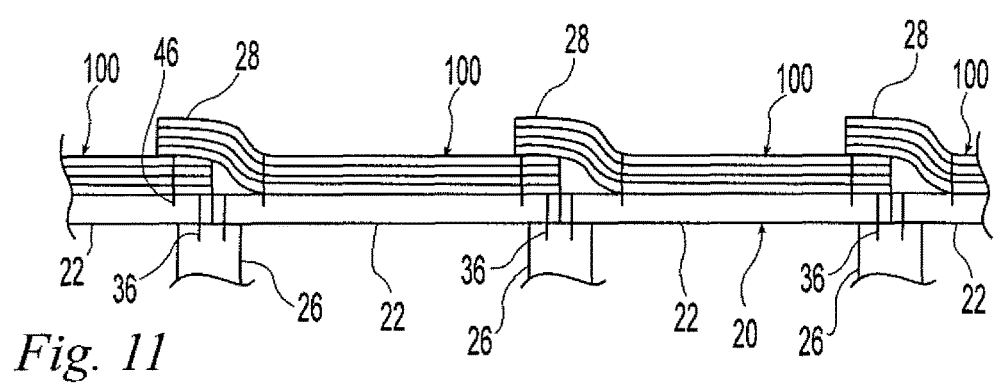
FIG. 11 is a cross-sectional view showing the disposable protective covering of FIGS. 5 and 6 installed on a deck of adjoining panels.

FIG. 11 shows the protective sheeting 100 on an installed deck 20 of adjoining panels 22. The panels 22 are installed by installing the fasteners 36 along each edge of the panels 22 and into the floor joists. The protective sheeting 100 is rolled out onto the upper surfaces of the panels 22, aligned using the printed lines 42, and cut to length. If desired, the protective sheeting 100 can be tacked and/or stapled in place with fasteners 46 at the designated locations. As adjacent pieces of the protective sheeting 100 are installed, the release liners 32 of the overlap portions 28 are removed and the overlap portions 28 are adhered onto the top surfaces of the adjacent pieces of the protective sheeting 100 so that the gaps or joints are covered to form a continuous protective covering. When installed onto the deck 20 in this temporary manner, the protective sheeting 100 allows for easy removal at the end of construction to facilitate easy cleanup of the jobsite and to provide a clean surface for the installation of flooring material onto the deck 20. Once construction is complete and/or the property is ready for cleanup, the protective sheeting 100 is simply pulled up and discarded. Any tacks and/or staples 46 used to hold the protective sheeting 100 are pulled out and the entire deck surface is vacuumed leaving the deck 20 in virtually new condition.

When the protective sheeting 100 is installed after construction of the deck 20 is complete but before any interior or exterior walls are constructed, the protective sheeting 100 is stretched across the deck 20 and fast tacked to band board around the perimeter of the deck 20. In the case of concrete floors, after the pouring and curing, the protective sheet is then installed on the floor, taped along the outside edge and all subsequent portions are overlapped and taped together. The overlap portions 28 are then adhered to ensure continuity of coverage. The protective sheeting 100 can then be tacked or stapled at varying points across the deck 20 to help keep the protective sheeting 100 in place. The walls are then erected over the protective sheeting 100. Once construction is complete and/or the property is ready for cleanup, a sharp blade can be run along the perimeter of all rooms to cut the protective sheeting 100 and the protective sheeting 100 is pulled up and discarded. Any tacks and/or staples 46 used to hold the protective sheeting 100 are pulled out and the entire deck surface is vacuumed leaving the deck 20 in virtually new condition.

Figure 7:
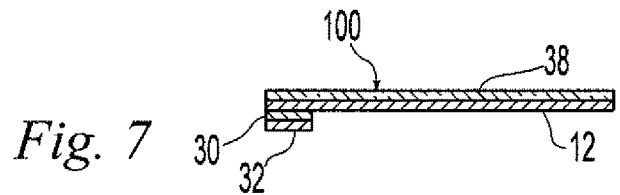
FIG. 7 is a cross-sectional view similar to FIG. 6 but showing a variation of the protective sheeting wherein an upper surface of the protective sheeting is treated to provide a non-slip surface rather than being laminated with a layer of paper.

FIG. 7 shows a variation of the second preferred embodiment of disposable protection sheeting 100 wherein the second layer 14 is eliminated and a suitable non-skid or slip-resistant surface 38 is provided directly onto the top surface of the first layer 12. The non-skid surface 38 can be obtained by any suitable application, abrasion, coating, or the like that doesn't detrimentally affect breathability of the first layer 12. This variation of the disposable protective sheeting 100 is preferably installed as discussed above.

Figure 8:
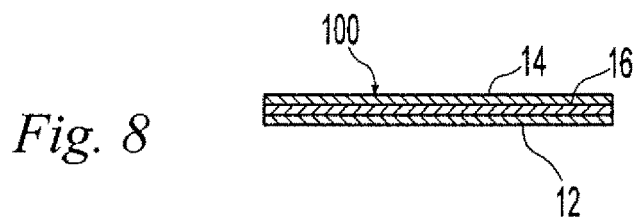
FIG. 8 is a cross-sectional view similar to FIG. 6 but showing another variation of the protective sheeting wherein the sheeting does not have an overlap portion for adjoining panels.

FIG. 8 shows another variation of the second preferred embodiment of disposable protection sheeting 100 wherein the overlap portion 28 is eliminated. A thin strip or tape 40 of the protective sheeting 100 much like the overlap portion 28 is applied over the joints or seams at both sides to provide a continuous protective surface as described in more detail hereinafter. It is noted that the illustrated protective sheeting 100 has a width of about four feet to cover the illustrated standard-size panels of decking material 22 but it is noted that any other suitable size can alternatively be utilized.

Figure 12:
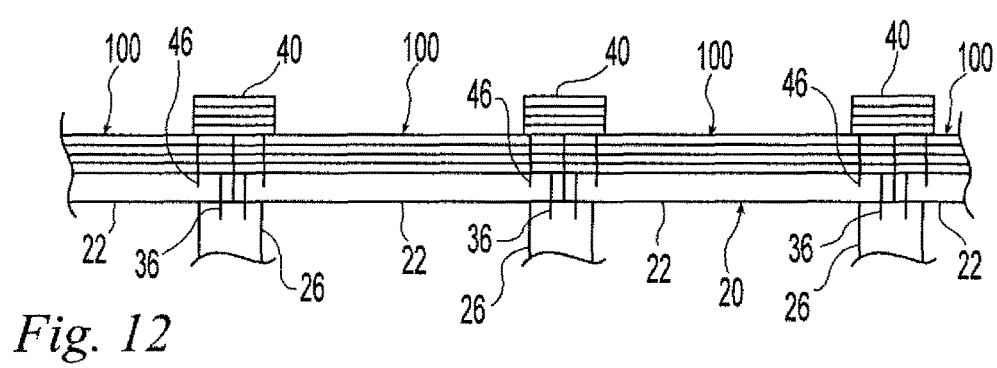
FIG. 12 is a cross-sectional view showing the disposable protective covering of FIG. 4 installed on a deck of adjoining panels.

FIG. 12 shows the variation of the protective sheeting 100 installed onto a deck 22 of adjoining panels 22. The panels 22 are installed by installing the fasteners 36 along each edge of the panels 22 and into the floor joists. The protective sheeting 100 is rolled out onto the top surface of the panels 22, aligned, and cut to length. If desired, the protective sheeting 100 can be tacked and/or stapled in place with fasteners 46 at the designated locations 44. Once adjacent pieces of the protective sheeting 100 are down, the release liner 32 of the tape 40 is removed and the tape 40 is adhered onto the top surface of the protective sheeting 100 of the adjoining panels 22 at the joints and seams so that the gaps or joints are covered to form a continuous protective covering. When applied to the deck 20 in this temporary manner, the protective sheeting 100 allows for easy removal at the end of construction to facilitate easy cleanup of the jobsite and to provide a clean surface for the installation of flooring material onto the deck surface. Once construction is complete and/or the property is ready for cleanup, the protective sheeting 100 and the tape 40 is simply pulled up and discarded. Any tacks and/or staples 46 used to hold the protective sheeting 100 are pulled out and the entire deck surface is vacuumed leaving the deck 20 in virtually new condition.

It is apparent from the forgoing that the present invention provides improved materials and methods for protecting decks and floors 20 that are relatively inexpensive, are easy to use, and save a considerable amount of time and effort during construction. It is also apparent that multiple layers of the protective sheeting 10, 100 can be utilized if desired. For example, multiple layers of the protective sheeting 10, 100 can be used in long term constructions projects so that a top one of the layers of protective sheeting 10, 1000 can be removed as work progresses. The layers of protective sheeting 10, 100 are preferably oriented ninety degrees to each other.

Figure 13:
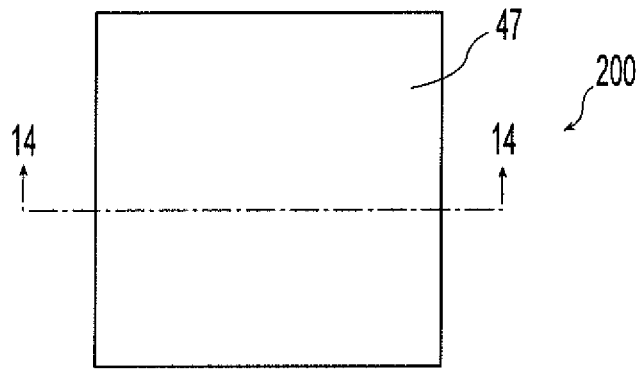
FIG. 13 is a top plan view of disposable protective sheeting according to a third embodiment of the present invention.
Figure 14:
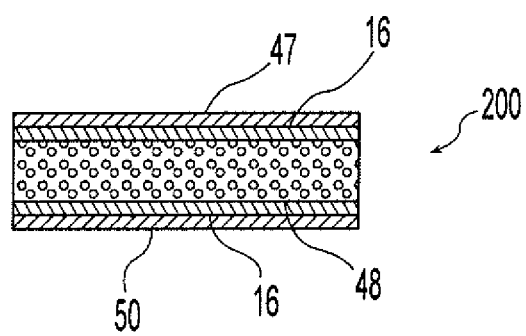
FIG. 14 is a cross-section view taken along line 14-14 of FIG. 13.

FIGS. 13 and 14 show disposable protective sheeting 200 according to a third preferred embodiment of the present invention wherein like reference numbers are utilized to indicate like structure. The protective sheeting 200 according to the third embodiment of the present invention includes padding or cushioning to protect finished flooring materials such as, for example, wood, stone, ceramic, other tile materials, and the like. The illustrated disposable protective sheeting 200 is a multi-layer laminate sized and shaped as a sheet or panel so that it can be handled easily and temporarily attached to the finish flooring material at the construction site after the finish material has been installed on the decking material. It is noted however that the protective sheeting could alternatively be provided in roll form. It is noted that the illustrated protective sheeting 200 has a width of about four feet and a length of about four feet but it is noted that any other suitable size can alternatively be utilized.

The illustrated disposable protective sheeting 200 is a multi-layer laminate that includes a first layer or sheet 47 of barrier material, a second layer of cushioning or padding material 48 permanently bonded to the bottom surface of the first layer 47 with adhesive 16, and a third layer or sheet 50 of underlay or non-stick material permanently bonded to the bottom surface of the padding layer 48 with adhesive 16. The barrier material of the first layer 47 can be any suitable material that provides a barrier that is impermeable to liquids and is tear resistant. The barrier material of the first layer 47 protects the top surface of the flooring material from contamination and permanent damage from scratches, spilled and tracked liquids, and wet as well as dry substances. The barrier material of the first layer 47 can be permeable to water vapor but it is not required because at this point the building should be dry. The barrier material of the first layer 47 can be, for example, nonwoven spunbonded olefin available from E.I. DuPont known as TYVEK or any other suitable material. The padding or cushioning material of the second layer 48 protects the flooring material from impact damage due to dropped tools and the like. The padding material of the second layer 48 can be high density foam, fiber fill, bubble cushion, or any other suitable material. Using high density foam would give the sheets good rigidity making them easy to handle. The non-stick material of the third layer 50 is provided to avoid the remote possibility of the padding material sticking to the finished flooring material. The non-stick material of the third layer 50 can be, for example, a polyethylene sheet including "Visqueen".

Once the final flooring material is installed on the decking material, the sheets of protective sheeting 200 are laid out, cut to span the room or hallway, and taped together. The edges are taped down to the floor with a tape that does not leave any residue. If desired the sheets can be printed with faint lines to facilitate cutting straight lines to fit a room or hallway. After construction was done, or the move in complete, the tape is removed from the floor and the protective sheets can be discarded or kept and reused if not damaged.

Figure 15:
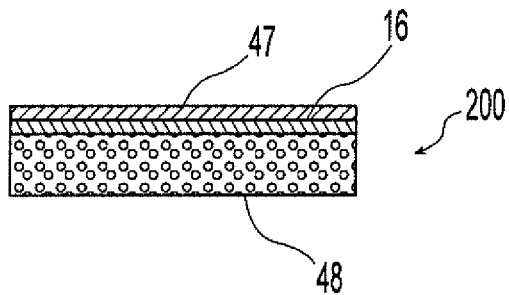
FIG. 15 is a cross-sectional view similar to FIG. 14 but showing a variation of the protective sheeting wherein an under layer is omitted.

FIG. 15 shows a variation of the third preferred embodiment of disposable protection sheeting 200 wherein the third layer 14 is eliminated. Tear resistance and cushioning properties are maintained and the cost is reduced. This variation of the disposable protective sheeting 200 is preferably installed as discussed above.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A method of protecting a deck or floor during building construction comprising steps of, in combination:
    obtaining a plurality of separate panels of subfloor decking material each having disposable protective sheeting temporarily secured directly to an upper surface of each of the separate panels of subfloor decking material to provide a barrier against liquid and solid contaminants during building construction after the plurality of separate panels of subfloor decking material are installed to form the deck or floor during building construction and for removal from the upper surface of each of the separate panels of subfloor decking material to be disposed at an appropriate time near completion of building construction;
    installing the plurality of separate panels of subfloor decking material with the disposable protective sheeting thereon to form the deck during building construction so that persons can walk directly on the disposable protective sheeting rather than directly on the deck or floor to protect the upper surface of each of the separate panels of subfloor decking material forming the deck or floor against liquid and solid contaminants during building construction;
    removing the disposable protective sheeting from the upper surface of each of the separate panels of subfloor decking material forming the deck or floor before completion of building construction; and
    installing final flooring material onto the upper surface of the subfloor decking material forming the deck or floor after removing the disposable protective sheeting from the upper surface of each of the separate panels of subfloor decking material forming the deck or floor.

2. The method according to claim 1, wherein the disposable protective sheeting is impervious to water and pervious to water vapor to allow water vapor to pass through the disposable protective sheeting from the upper surface of each of the panels of subfloor decking material forming the deck or floor.

3. The method according to claim 2, wherein the disposable protective sheeting includes adhesive temporarily securing the disposable protective sheeting directly to the upper surface of each of the separate panels of subfloor decking material without detrimentally affecting the water vapor permeability of the disposable protective sheeting.

4. The method according to claim 1, wherein the disposable protective sheeting is configured to have a slip-resistant upper surface.

5. The method according to claim 4, wherein the disposable protective sheeting comprises a first layer of a barrier material effective to provide a barrier against liquid and solid contaminants and a second layer of an overlay material providing a slip-resistant upper surface, and wherein the second layer is secured to an upper side of the first layer.

6. The method according to claim 4, wherein the disposable protective sheeting comprises a single layer of a barrier material effective to provide a barrier against liquid and solid contaminants and configured to provide a slip-resistant upper surface.

7. The method according to claim 1, wherein the disposable protective sheeting includes adhesive temporarily securing the disposable protective sheeting directly to the upper surface of each of the separate panels of subfloor decking material.

8. The method according to claim 1, further comprising the step of applying adhesive tape to at least some edges of the disposable protective sheeting to secure the disposable protective sheeting to the upper surface of at least one of the separate panels of subfloor decking material.

9. The method according to claim 1, wherein the separate panels of subfloor decking material each comprise one of plywood, oriented strand board (OSB), and composite particle board.

10. A method of making a protected panel of subfloor decking material for constructing deck or floor of a building comprising steps of, in combination:
    obtaining a separate panel of subfloor decking material having an upper surface to be used for constructing the deck or floor;
    obtaining disposable protective sheeting configured for temporary securement directly to the upper surface of the separate panel of subfloor decking material to provide a barrier against liquid and solid contaminants during building construction and for removal from the upper surface of the separate panel of subfloor decking material before completion of building construction;
    temporarily and directly securing the disposable protective sheeting to the upper surface of the separate panel of subfloor decking material before the separate panel of subfloor decking material is installed to form the deck or floor such that that the disposable protective sheeting can protect the upper surface of the separate panel of subfloor decking material against liquid and solid contaminants after installation of the separate panel of subfloor decking material to form the deck or floor during building construction and the disposable protective sheeting can be removed from the upper surface of the separate panel of subfloor decking material after installation to form the deck or floor and before completion of building construction.

11. The method according to claim 10, wherein the separate panel of subfloor decking material is one of plywood, oriented strand board (OSB), and composite particle board.

12. The method according to claim 10, wherein the disposable protective sheeting is impervious to water and pervious to water vapor to allow water vapor to pass through the disposable protective sheeting from the upper surface of the separate panel of subfloor decking material.

13. The method according to claim 12, wherein the disposable protective sheeting includes adhesive temporarily securing the disposable protective sheeting directly to the upper surface of the separate panel of subfloor decking material without detrimentally affecting the water vapor permeability of the disposable protective sheeting.

14. The method according to claim 10, wherein the disposable protective sheeting is configured to have a slip-resistant upper surface.

15. The method according to claim 14, wherein the disposable protective sheeting comprises a first layer of a barrier material effective to provide a barrier against liquid and solid contaminants and a second layer of an overlay material providing a slip-resistant upper surface, and wherein the second layer is secured to an upper side of the first layer.

16. The method according to claim 14, wherein the disposable protective sheeting comprises a single layer of a barrier material effective to provide a barrier against liquid and solid contaminants and configured to provide a slip-resistant upper surface.

17. The method according to claim 10, wherein the disposable protective sheeting has overlap portion formed along at least one edge that extends beyond the separate panel of subfloor decking material and the overlap portion has a pressure-sensitive adhesive layer at a bottom surface of the disposable protective sheeting and a release liner protectively covering the pressure-sensitive adhesive layer.

18. The method according to claim 17, wherein the disposable protective sheeting does not cover the upper surface of the separate panel of subfloor decking material along at least one edge of the separate panel of subfloor decking material.

19. The method according to claim 10, wherein the disposable protective sheeting includes adhesive for temporarily securing the disposable protective sheeting directly to the upper surface of the separate panel of subfloor decking material.

20. A method of protecting a deck or floor during building construction comprising steps of, in combination:
obtaining a plurality of separate panels of subfloor decking materials with disposable protective sheeting temporarily secured directly to an upper surface of each of the separate panels of subfloor decking material;
wherein each of the plurality of separate panels of subfloor decking material is one of plywood, oriented strand board (OSB), and composite particle board;
wherein the disposable protective sheeting includes adhesive temporarily securing the disposable protective sheeting to the upper surface of each of the plurality of separate panels of subfloor decking material and is configured to provide a barrier for the upper surface of each of the separate panels of subfloor decking material against liquid and solid contaminants during building construction and for removal from the upper surface of each of the separate panels of subfloor decking material forming the deck or floor to be disposed at an appropriate time near completion of building construction;
installing the separate panels of subfloor decking material with the disposable protective sheeting temporarily secured thereon to construct the deck or floor so that persons can walk directly on the disposable protective sheeting to protect the upper surface of each of the separate panels of subfloor decking material forming the floor or deck against liquid and solid contaminants during building construction;
removing the disposable protective sheeting from the upper surface of each of the separate panels of subfloor decking material forming the deck or floor before completion of building construction; and
installing final flooring material onto the upper surface of each of the separate panels of subfloor decking material forming the deck or floor after removing the disposable protective sheeting from the upper surface of each of the separate panels of subfloor decking material forming the deck or floor.

* * * * *